W. J. O'NEIL.
PROTECTOR AND REINFORCEMENT FOR PNEUMATIC TIRES.
APPLICATION FILED AUG. 11, 1908.
919,938.
Patented Apr. 27, 1909.
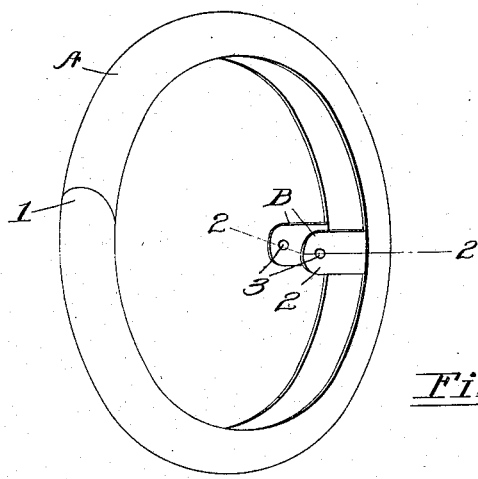
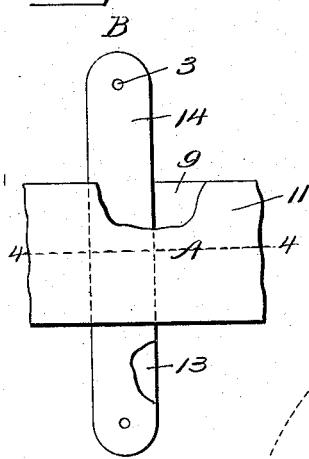
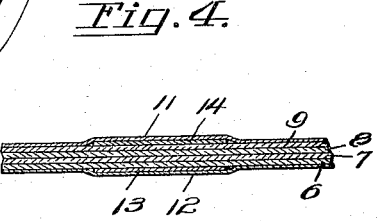
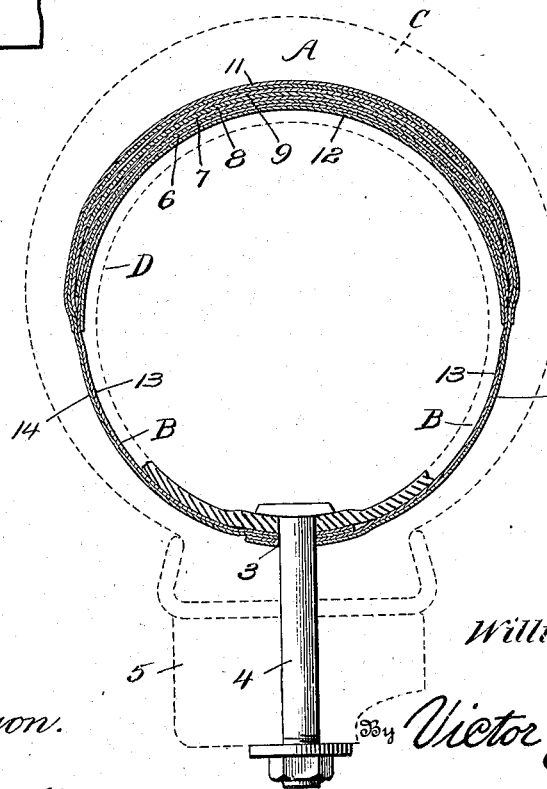
Witnesses
F. C. Gibson.
C. Bradway.
Inventor
William J. O'Neil.
By Victor J. Evans
Attorney

UNITED STATES PATENT OFFICE.

WILLIAM J. O'NEIL, OF AKRON, OHIO.

PROTECTOR AND REINFORCEMENT FOR PNEUMATIC TIRES.

No. 919,938.

Specification of Letters Patent.   Patented April 27, 1909.

Application filed August 11, 1908.   Serial No. 448,045.

*To all whom it may concern:*

Be it known that I, WILLIAM J. O'NEIL, a citizen of the United States, residing at Akron, in the county of Summit and State of Ohio, have invented new and useful Improvements in Protectors and Reinforcements for Pneumatic Tires, of which the following is a specification.

This invention relates to a protector and reinforcement for pneumatic tires, designed to be used within the case or sheath of the tire to reinforce the same and to cover the inner tube to protect the latter from puncturing.

The invention has for one of its objects to provide a device of this character so designed as to be used as an attachment for tires of varying styles and makes without changing the inner tube, and which is light and flexible and of such shape as to conform to the case and inner tube, the reinforcement and protector being constructed of superimposed layers of duck or similar material shaped on a suitable form and bound together by vulcanizing the rubber cutting the surfaces of the layers.

Another object of the invention is the provision of a simple and effective means for securing the protector and reinforcement in place by attaching the same to the valve stem of the inner tube so that gripping or lateral displacement is effectively prevented.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a perspective view of the tire protector and reinforcement. Fig. 2 is a transverse section thereof taken on line 2—2, Fig. 1, showing the relation of the same to the parts of the tire. Fig. 3 is a fragmentary plan view of the portion of the device adjacent the securing band. Fig. 4 is detail sectional view on line 4—4, Fig. 3. Fig. 5 is a sectional view of a portion of one of the duck layers of the device showing the opposite faces thereof covered with unvulcanized rubber.

Similar reference characters are employed to designate corresponding parts throughout the several views.

Referring to the drawing, A designates the protector and reinforcement of the tire which is of annular form to fit in the case of the tire and is of crescent-shaped cross section to be accommodated between the case and inner tube of a tire, the device being of such length as to overlap at the ends 1 to form a complete protector around the tire. At a suitable point, the device is provided with a band B secured in place in any suitable manner and of such length as to extend entirely around the inner tube and overlap, and the overlapping portions or ears 2 are provided with apertures 3 for receiving the valve stem of the inner tube so that creeping of the device or transverse displacement will be prevented.

By reference to Fig. 2, it will be observed that the device A fits into the case or sheath C that extends approximately around the outer half thereof to protect that portion of the tire exposed to puncturable objects, and fitting in the case and under the reinforcing and protecting device A is the inner tube D of the pneumatic tire. The tube D is provided with the usual valve stem 4 that extends through the felly 5 of the wheel to which the tire is applied and this stem passes through the apertures 3 of the ears formed by the extremity of the transversely-extending band B, these ears being disposed between the inner tube and the base of the casing, as shown.

The protecting and reinforcing device A is composed of a plurality of superimposed layers 6, 7, 8 and 9, of duck or other suitable material capable of resisting the penetration of nails, glass or the like. Any desired number of layers may be employed but in the present instance only four are shown, and the layer 6 is of greater width than the intermediate layers 7 and 8, which are of decreasing width so as to be arranged in stepped relation at the edges, and a top layer 9 is of such width as to cover the edges of the intermediate layers and thus form a structure of crescent form; that is to say, the device is of decreasing thickness from its center to the edges so as to be concavo-convex to conform to the inside of the casing of the tire and the outside of the inner tube when the latter is inflated. These layers are frictioned on both surfaces with unvulcanized rubber designated by 10, Fig. 5, for a purpose hereinafter to appear, and these layers are covered by top and bottom covers 11 and 12 of suitable flexible fabric. The fastening band B comprises two strips 13 and 14 of fabric similar to the coverings 11 and 12, one of which extends over the outside layer and under the outer covering 11, while the other strip extends between the inner layer of duck and the bottom covering, the ends of the strips being stuck together by vulcanizing rubber between them or in any other suitable manner so as to obtain the required strength.

In constructing the protecting and reinforcing device, a circular form of suitable diameter is required that has an outer surface of convex cross section to correspond to the transverse contour of the inner tube of the tire and on this form is placed the strip of fabric constituting the under covering 12. At a suitable point on this covering is positioned the strip 13 of the securing band B, and over these two pieces is placed the first layer 6. This layer is rolled down to conform to the shape of the form and then the other layers are successively placed in position and separately rolled to the form, the longitudinal center lines of the respective layers being coincident with each other. After the layers of duck are thus applied, the second strip 14 of the securing band is positioned on the partly formed device and the outer covering 11 then applied, the inner and outer coverings being arranged with their corresponding edges meeting. The article, which is now completely formed, is wrapped with cloth and put in a heater for vulcanization, the rubber coating the layers serving as bindings not only between the layers but between the fabric coverings 11 and 12 and strips 13 and 14 of the securing band, so that no fastenings are required since the article becomes of substantially unitary or integral structure.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim is:—

A protecting and reinforcing device constituting an attachment for inner tube pneumatic tires and adapted to be inserted within the sheath of the tire and around the inner tube thereof, said device consisting of a flexible member of greater length than the circumference of the inner tube to extend entirely around the same with its ends overlapping, and an attaching band fixedly secured to the member and extending transversely thereto, said band being of such length as to embrace the inner tube in a transverse plane and to have its ends overlapping, said overlapping ends of the band being apertured to receive the stem of the inner tube.

In testimony whereof I affix my signature in presence of two witnesses.

WILLIAM J. O'NEIL.

Witnesses:
WILLIAM T. VAUGHAN,
JOHN R. VAUGHAN.